May 19, 1964
O. MOKLEBUST
3,133,812
INTEGRATED CHARRING AND ORE REDUCTION
Filed Jan. 3, 1961
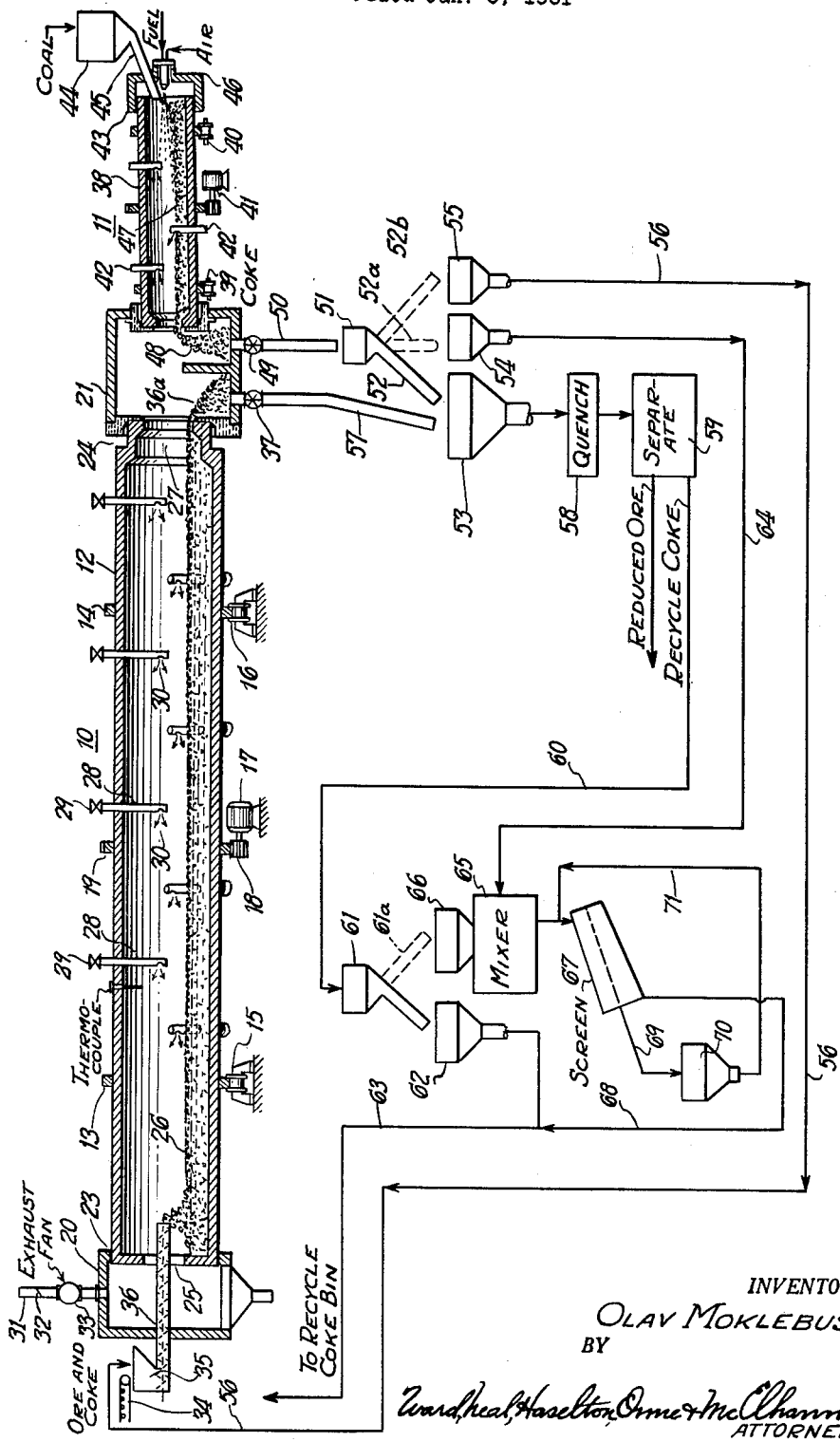
INVENTOR.
OLAV MOKLEBUST
BY
Ward, Neal, Haselton, Orme & McChannon
ATTORNEYS.

3,133,812
INTEGRATED CHARRING AND ORE REDUCTION
Olav Moklebust, Birmingham, Ala., assignor to R-N Corporation, New York, N.Y., a corporation of Delaware
Filed Jan. 3, 1961, Ser. No. 80,296
3 Claims. (Cl. 75—36)

This invention pertains to the direct reduction of iron ores and the like in the presence of hot combustible gases and solid carbonaceous fuel, and provides improved methods and apparatus therefor wherein the physical heat values as well as the chemical heat values of the hot combustible gases and the hot char resulting from the charring of a relatively high volatile carbonaceous material, such as coal, are utilized in reduction of the ore.

In processes as heretofore practiced using solid reducing agents for low temperature ore reduction, ore and carbonaceous matter are usually mixed and heated up to reaction temperature. As the reaction temperatures are generally higher than the temperatures required for volatilization of the volatile matter contained in the reducing agent, these volatiles are usually lost to the process proper. Because the ore-carbon mixtures are heated up in counter current, the volatile matter is distilled off at a temperature where its combustion is not needed and where its reducing power is not effective due to the low temperature. In these processes, therefore, the volatile matter can only be utilized outside the reactor, for instance, by combustion. Thus, most of the solid reductant processes prefer to use coke, coke breeze or low volatile anthracites rather than high volatile coals. However, in visualizing large commercial installations, the availability of low cost coke or coke breeze in sufficient quantities presents a serious problem, whereas coal is widely available at a relatively low cost.

Coal may be employed as the immediately available source of the solid reductant, by charring the same, and concurrently reducing the ore in the presence of the hot combustible gases and optionally also the hot char resulting from the charring process. Alternatively, the hot char may be admixed with the wet recycle solid reductant, separated from the reduced ore product in continuous reduction processes, thereby to provide the necessary physical heat to dry the recycle reductant and supply a low volatile make-up char to offset that lost in the process. In this way the physical heat values of the hot char gas and char as well as the chemical heat values thereof are utilized in reducing the ore.

However, such coal charring processes as have heretofore been developed for integrated coal charring and ore reduction procedures in the manner aforesaid, such as fluidized or grate charring processes, require that the charring be done in apparatus outside the ore reduction furnace, and in a manner such that different operating techniques and personnel are entailed in carrying out these operations, respectively.

Now in accordance with the basic concept of my invention, I have devised an integrated coal charring and ore reduction method and apparatus which utilizes the same operating techniques for both, thereby simplifying the over-all operation and eliminating the necessity for a special charring operation crew.

The novel apparatus of my invention is of a composite rotary kiln construction, comprising a relatively small rotary charring kiln and a larger rotary ore reduction kiln, the delivery ends of which terminate in a stationary housing, common to the two, and the feed ends of which are separately housed in stationary housings individual thereto. The feed end housings are, respectively, provided with means for feeding crushed ore and the solid reductant together with stone if required, into the feed end of the ore reduction kiln and crushed coal or an equivalent high volatile, solid carbonaceous reductant into the feed end of the charring kiln. The reduction kiln is provided at its feed end with a stack containing a fan and damper for regulating the draft. The hot combustible gases evolved in the charring kiln pass directly through the common delivery end housing into the reduction kiln. This housing is also provided with means for separately discharging the hot reduced ore product and the hot char delivered from the ore reduction and charring kilns, respectively. For initial heating of the charring kiln, a burner is provided at its feed end.

Both kilns are preferably constructed and operated in accordance with the principles set forth in my U.S. Patent 2,829,042, the rotary kiln construction of which employs a series of air inlet tubes penetrating the rotary kiln wall at intervals therealong and thereabout, these tubes extending to the kiln axis on the interior and being provided with outlets for directing the air flow axially of the kiln, and being provided exteriorly of the kiln with air inlet valves for adjustably regulating the temperature and combustion conditions throughout the kiln to provide optimum conditions of furnace performance.

In accordance with the novel process of my invention utilizing the aforesaid apparatus, the coal to be charred is crushed to approximately the size of char required for ore reduction in the ore reduction kiln. The so-crushed coal is fed continuously and progressively into the rotary charring kiln. Initial heating of the charring kiln is provided by the burner mounted at the feed end for introduction and ignition of an air-fuel mixture. As the coal passes progressively through the charring kiln, it is heated up and charred, the necessary heat for maintaining the operation being thereafter supplied by combusting a portion of the hot combustible gases evolved from the coal. The necessary air for accomplishing this is drawn into the charring kiln through the air inlet tubes thereof, by the forced draft provided by the stack fan in the ore reduction kiln. The hot combustible gases generated in the charring kiln flow directly into the ore reduction kiln through the common housing, in which as above stated, the delivery end of the charring kiln terminates. Thus the physical as well as the chemical heat values of the hot char gases are utilized in the ore reduction process.

The hot char delivered from the charring kiln may be conveyed directly to the feed end of the ore reduction kiln and fed therein along with the ore and recycle coke, and lime if employed, thereby to preheat the same and thus expedite the ore reduction. Alternatively, the hot char may be admixed with the wet recycle coke, separated from the reduced ore product delivered from the ore reduction kiln, thereby to dry the same, and provide the necessary low volatile make-up char. As a further alternative, the hot char from the charring kiln may be fed together with the reduced ore product of the reduction kiln into the cooling, quenching and separating sequences, for providing clean recycle char where a low grade or contaminated coal is employed for charring.

Having thus described the invention in general terms, reference will now be had for a more detailed description, to the accompanying drawing, which shows diagrammatically and schematically the essential construction and flow diagram operation of a preferred embodiment for practicing the invention.

Referring to the drawing, the rotary ore reduction and charring kilns are shown generally at 10 and 11, respectively. The ore reduction kiln comprises an elongated tubular kiln 12, suitably lined and provided with a pair of spaced bearing rings 13, 14, encircling the same, for rotatably supporting the kiln on rollers journaled to bearing supports, as at 15, 16. The kiln is rotated by a motor 17, to the shaft of which is keyed a pinion 18, meshing with a ring gear 19, mounted on the kiln and extending thereabout.

Disposed at the opposite ends of the rotary kiln 12, are stationary housings 20, 21, comprising, respectively, a feed end housing at the feed end, and a delivery end housing. Both ends are equipped with fluid-tight, water cooled seals between the rotary kiln and housings as at 23, 24.

At the feed end and secured to the feed end housing 20, is mounted a kiln charge retaining plate 25, covering about one-half the kiln radial area, which permits the kiln to be operated with a high kiln load 26, without back spillage and with a maximum exit gas opening for the kiln gases. At the delivery end, the kiln 12 terminates in a retaining dam 27 for the kiln load, insuring a relatively deep bed depth in this part of the kiln. Also in the rotary kiln 12, are mounted at longitudinally and radially spaced intervals, a series of air inlet tubes, as at 28, which extend from the exterior to the axis thereof. The exterior ends of these tubes are fitted with manually or otherwise individually controlled, air inlet valves, as at 29, while the inner ends are provided with openings which are directed co-directional with the flow of gases in the kiln, as at 30, for controlling the temperature and combustion conditions throughout the kiln, as described in my patent aforesaid. The feed end housing 20 is connected to a stack 31, mounting therein a damper 32, and a blower or fan 33, for controlling the draft in the kiln.

Also at the feed end, surge bins (not shown) are provided for storage of ore, limestone, fresh coke and recycle coke, respectively, the discharges from which are fed by a belt conveyor 34, into a hopper 35, and thence by a screw conveyor 36 into the kiln 12. At the delivery end, the reduced ore product 36a, discharged from the kiln, is delivered into the housing 21, and is discharged thence through a hopper containing a rotary star valve, as at 37, for providing a relatively gas-tight discharge outlet.

The construction of the charring kiln 11 is substantially like that of the ore reduction kiln 10, and hence requires little comment. The rotary kiln unit 38, is rotatably mounted, as at 39, 40, in the same manner as kiln 12, above described, and is similarly motor driven, as at 41. Air inlet tubes are provided, as at 42, for the same purpose as tubes 28.

The rotary kiln 38 extends between a stationary feed end housing 43, and the common delivery end housing 21, as shown, being provided thereat with water cooled seals between the kiln and housings, the same as for kiln 12, as above described.

At the feed end, the charring kiln 11, is provided with a hopper 44, into which the crushed coal is delivered, and discharged thence through a screw or gravity conveyor 45, into the rotary kiln 38. For initial heating of the kiln 11, a burner 46 is mounted in the feed end housing 43, through which an air-gas mixture is supplied and burned within the kiln. Thereafter the necessary heat for charring the coal is supplied by combusting part of the volatiles evolved from the hot bed 47 of coal and char within the kiln. The necessary air stream for charring the coal is drawn into the charring kiln through the air inlet tubes 42, by the draft provided by the stack blower 33 of the ore reduction kiln, as a result of which the hot char gases generated in the charring kiln 38 will flow directly into the ore reduction kiln 12, through chamber 21 into which both of these tubes extend in open-ended manner as shown. The hot char passes out of the charring kiln 38 into the chamber 21, as at 48, and is discharged thence through a hopper containing a rotary star valve as at 49.

The hot char from the charring kiln may be utilized in any of the ways above described. Thus, as illustrated purely by way of alternative routing in the drawing, but not by way of limitation to any particular apparatus employed, the hot char may, for example, be delivered by gravity feed from hopper 49 into a chute 50 and thence into a hopper 51, which may be rotated to discharge the hot char through the slanted hopper outlet 52 thereof, into any of hoppers 53, 54, 55, depending on the position to which the outlet 52 is rotated, as at 52, 52a, 52b.

If the hot char is thus delivered into hopper 55, it is conveyed thence over a suitable conveying system indicated schematically at 56, directly into the hopper 35, at the feed end of the ore reduction kiln 10, along with the ore, recycle coke, and lime if the latter is employed, thus to preheat the input charge to the furnace and thereby expedite the ore reduction, and also to replace the char consumed in the ore reduction.

If, on the other hand, the coal used for charring is contaminated or "dirty," it may be discharged from hopper 51 into hopper 53, into which the reduced ore product discharged from the reduction kiln, is also delivered via chute 57, and the admixture discharged thence into a quenching tank 58, and conveyed thence into a conventional separating apparatus 59, including screening, magnetic separation and tabling, for removing the ash and separating the iron values from the recycle coke or char. The latter is conveyed thence as indicated schematically at 60, into a rotatable hopper 61, similar to hopper 51, from whence it is discharged into a hopper 62 by appropriate rotation of hopper 51 as indicated, and conveyed thence, as indicated at 63, into the recycle coke or char bin at the feed end of the ore reduction kiln 10.

As a final alternative, the char from kiln 11, if it is of good quality, may be discharged from hopper 51 into hopper 54, and conveyed thence, as indicated at 64, into a mixer 65, into which the recycle coke from the separator 59 is also discharged by positioning hopper 61, as indicated at 61a, to discharge into hopper 66, which in turn discharges into the mixer 65 as shown.

In the mixer 65, the physical heat of the hot char, dries the wet, recycle coke or char, from whence the dried and blended admixture is discharged onto a screen 67, the fines through which are conveyed, as indicated at 68, and thence as indicated at 63, to the recycle coke bin; while the oversize material, held on the screen, is delivered as indicated at 69, into a grinder 70, and returned to the screen for re-sieving, as indicated at 71.

What is claimed is:

1. A continuous process employing a pair of rotary kilns for reducing ore in the presence of hot combustible gases and a low volatile solid carbonaceous reductant, derived at least in part from a high volatile such reductant, which comprises: progressively feeding said high volatile reductant through a first said kiln and burning a portion thereof therein by controlled introduction of a free oxygen-containing gas, to provide heat for charring the remainder to a low state of volatility with evolution of hot combustible gases, passing said hot gases as evolved into the second said kiln while countercurrently feeding said ore therethrough together with said low volatile reductant, at least a portion of which comprises the low volatile char discharged from the first kiln, and reducing said ore in said second kiln by burning said combustible gases therein with a free oxygen-containing gas introduced therein at a rate such as to provide the requisite temperature for reducing said ore.

2. A continuous process employing a pair of rotary kilns for reducing ore in the presence of hot combustible gases and a low volatile solid carbonaceous reductant, derived at least in part from a high volatile such reductant, which comprises: progressively feeding said high volatile reductant through a first said kiln and burning a portion thereof therein by controlled introduction of a free oxygen-containing gas, to provide heat for charring the remainder to a low state of volatility, with evolution of hot combustible gases, passing said hot gases as evolved into the second said kiln while countercurrently feeding said ore therethrough together with the hot char discharged from the first said kiln, and reducing said ore in said second kiln by burning said combustible gases therein with a free oxygen-containing gas introduced therein at a rate to provide the requisite temperature for reducing said ore.

3. A continuous process employing a pair of rotary kilns for reducing ore in the presence of hot combustible gases and a low volatile solid carbonaceous reductant, derived at least in part from a high volatile such reductant, which comprises: progressively feeding said high volatile reductant through a first said kiln and combusting a portion thereof therein by controlled introduction of a free oxygen-containing gas, to provide heat for charring the remainder to a low state of volatility with evolution of hot combustible gases, passing said hot gases as evolved into the second said kiln while countercurrently feeding said ore therethrough together with said low volatile reductant, water quenching the reduced ore product discharged from the second said kiln, separating the solid carbonaceous values, and admixing with the hot char discharged from the first said kiln, to provide at least a portion of said low volatile solid carbonaceous reductant fed with said ore material into the second said kiln.

References Cited in the file of this patent

UNITED STATES PATENTS

| | | |
|---|---|---|
| 1,940,246 | Clark et al. | Dec. 19, 1933 |
| 2,184,297 | Grindle | Dec. 26, 1939 |
| 2,829,042 | Moklebust | Apr. 1, 1958 |
| 2,877,108 | Smith et al. | Mar. 10, 1959 |
| 2,921,770 | Spence | Jan. 19, 1960 |